A. GERARD.
INCUBATOR.
APPLICATION FILED MAR. 26, 1908.
964,509.
Patented July 19, 1910.
2 SHEETS—SHEET 2.
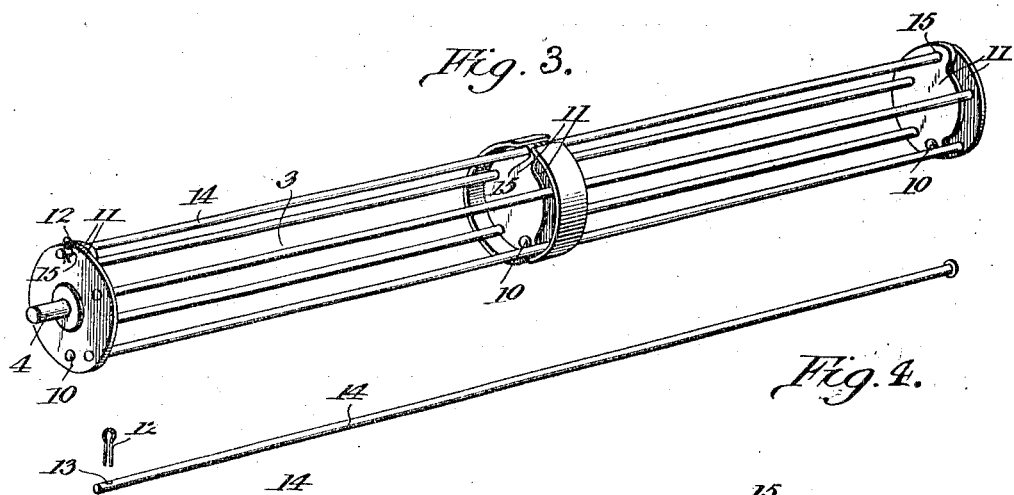
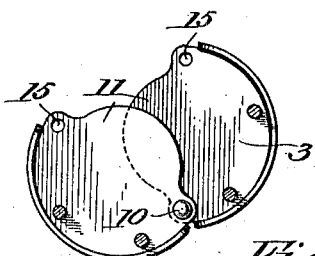
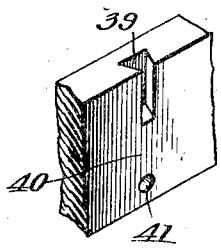
Witnesses:
Frank H. Mayer
Inventor,
Alonzo Gerard

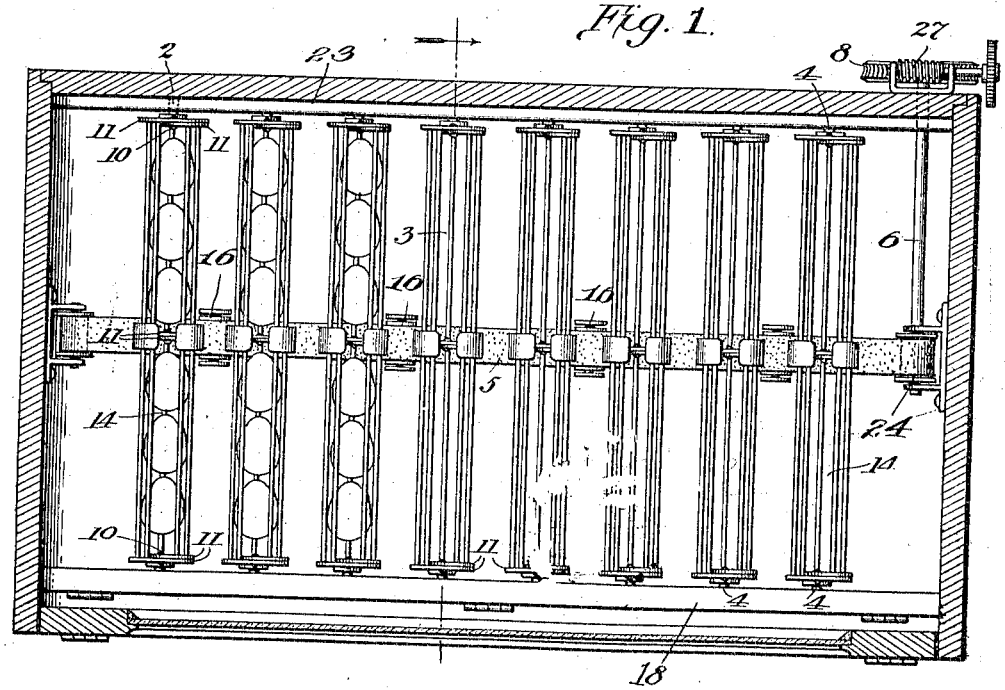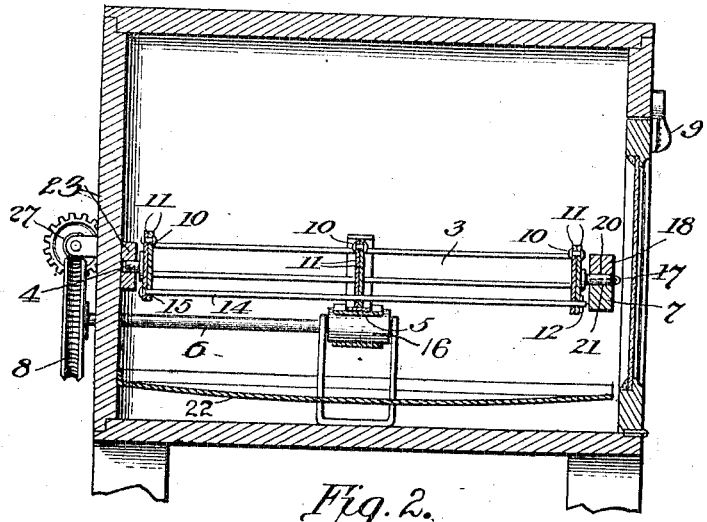

UNITED STATES PATENT OFFICE.

ALONZO GERARD, OF AUSTIN, TEXAS.

INCUBATOR.

964,509.  Specification of Letters Patent.  Patented July 19, 1910.

Application filed March 26, 1908. Serial No. 423,472.

*To all whom it may concern:*

Be it known that I, ALONZO GERARD, a citizen of the United States, residing at Austin, in the county of Travis and State of Texas, have invented certain new and useful Improvements in Incubators, of which the following is a specification.

My invention relates to improvements in incubators, and the objects of my invention are: first—to provide cheaper and safer means in incubators which will automatically turn in bulk each and every egg equally and continuously, or at intervals, as often during day and night as required to prevent the yolks of the eggs from adhering to their shells, without shaking or breaking the same during their incubation, and insure very part of each egg receiving equal benefit of the temperature, moisture and cooling, without opening the incubator door, especially during the last several days of their incubation, thereby avoiding all danger from chilling the eggs; second—to dispense with the extra labor required daily for opening the incubator door to turn the eggs by hand and often enough, and when done are seldom equally turned; third—to provide safer means to enable the chicks to transfer themselves to the brooder without injury or assistance and at the same time permit the unhatched eggs to be turned without opening the incubator door at a time when danger of chilling the eggs is greatest. I attain these objects by the mechanism illustrated in the accompanying drawings of which—

Figure 1 is a horizontal section of the incubator; Fig. 2 is a vertical cross section;
Fig. 3 is a perpective of one of the cages; Fig. 4 is a perspective view of one of the locking rods for the cages; Fig. 5 and Fig. 6 are details in section of a cage.

The incubator casing is provided at one end thereof with a power shaft 6 journaled therein having one of its ends passed through to the outer side of the incubator wall for securing to it the gear wheel 8. The worm screw 27 supported in a suitable manner on the outer wall of the incubator meshes with said gear wheel 8 and drives the same when any suitable power is applied to said worm screw 27 for revolving the same.

A plurality of portable revolving egg cages 3 are located in the casing, each being provided with several expansible partitions 11, having in its lower edge a rivet hinge 10 for opening or closing same all at same time by one and the same operation to open or close each cage 3 for filling it with a single line or row of eggs. The middle partition 11 of each of said cages bears upon the power belt 5 after said cages are filled with eggs, the opposite ends of said cages being journaled in the holes or journal boxes 2 in the opposite walls of the incubator casing.

The power belt 5 is driven by pulley 24 on the inner end of said power shaft 6, said power belt being carried by several loose pulleys 16 supported in the casing by brackets, and said belt passes under and in contact with the cages for revolving the same when suitable power is properly applied to said worm screw 27 as aforesaid.

One end of each cage 3 is journaled in a strip 23 secured to the rear inside wall of the casing, and the opposite end of said cage is journaled in half journal boxes 20 and 21 between two bars 18 and 7 hinged together and secured to opposite inside walls of the incubator near the jamb of its door as shown in Fig. 2, at proper height to permit said cages to bear on said belt 5 as aforesaid, for revolving said egg cages. Fig. 3 shows one of the said cages 3 showing one of its journals 4 on its ends, also its three partitions 11 provided in their lower edge, each with a rivet hinge 10 to permit said cage 3 to open and close. The cage is unlocked by withdrawing the split key 12 from the key-hole 13 in the end of a rod 14 which extends through and may be withdrawn from the holes 15 in the upper edges of said three partitions 11 when said cage 3 may be opened, and closed by reversing the operation.

The top half journal box bar 18 is free at its ends and is provided with hinges 17 by which it is hinged to the top edge of said bottom bar 7 in such a manner so that when said journals 4 are in said bottom half journal boxes and the bar 18 is swung down said bars 17 and 7 meet each other and form said complete journal boxes 2, and when the incubator door is closed will keep said top journal bar over said journals 4 to prevent them from slipping out of their boxes until the incubator door is opened, when said top bar 18 may be swung up to allow the operator to remove one or all of said cages 3 when required for filling them with eggs and when the chicks are hatched the power is shut off and said egg cages are opened and left open in the closed incubator to give additional room for the other chicks to hatch and to pass down through between the bars of said cages into said brooder hammock 22 as above described. Said hammock consists of a web secured at its edges to the sides of the incubator box and located under the egg trays.

The frame and chamber of the incubator and its heating, ventilating, or cooling and moisture compartments may be constructed in the usual or any suitable manner with a suitable regulator for controlling heat to the proper temperature in the incubator chamber and having its incubating chambers so constructed to permit same being provided therein with the mechanism as illustrated in the several aforesaid drawings. The incubator door is hinged at its bottom edge and is opened by turning the button 9 at the top edge of said door.

I claim:

1. An incubator having a revolving device for holding eggs in a single row, a partition across said device having an external curved surface, and a belt moving in contact with said surface, for revolving the device.

2. A rotatable egg-holder for incubators, comprising an elongated cage formed with end plates and rods therebetween, and an intermediate partition having exterior surfaces constructed to bear upon a belt or the like, for rotating the holder.

ALONZO GERARD.

Witnesses:
DENNIS CORWIN,
EMILIE LIMBERG.